(12) United States Patent
Hearn et al.

(10) Patent No.: US 9,348,981 B1
(45) Date of Patent: May 24, 2016

(54) SYSTEM AND METHOD FOR GENERATING USER AUTHENTICATION CHALLENGES

(75) Inventors: Michael Christopher Hearn, Zurich (CH); Andrew M. Archer, San Francisco, CA (US); Madhukar Narayan Thakur, San Jose, CA (US); Honghai Shen, Los Altos Hills, CA (US); Shreyas S. Doshi, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 148 days.

(21) Appl. No.: 13/355,486

(22) Filed: Jan. 21, 2012

Related U.S. Application Data

(60) Provisional application No. 61/435,342, filed on Jan. 23, 2011.

(51) Int. Cl.
*G06F 21/31* (2013.01)
*H04L 9/32* (2006.01)

(52) U.S. Cl.
CPC .............. *G06F 21/31* (2013.01); *H04L 9/3271* (2013.01)

(58) Field of Classification Search
CPC ............................. G06F 21/31; H04L 9/3271
USPC ....................................................... 726/7, 27
See application file for complete search history.

(56) References Cited

U.S. PATENT DOCUMENTS

| | | | |
|---|---|---|---|
| 8,286,239 B1 * | 10/2012 | Sutton .............................. 726/22 |
| 8,402,548 B1 * | 3/2013 | Muriello et al. ................. 726/26 |
| 8,478,708 B1 * | 7/2013 | Larcom ........................... 706/52 |
| 2005/0097320 A1 * | 5/2005 | Golan et al. .................... 713/166 |
| 2007/0240227 A1 * | 10/2007 | Rickman et al. ................. 726/27 |
| 2007/0240230 A1 * | 10/2007 | O'Connell .............. G06F 21/55 726/28 |
| 2008/0066165 A1 * | 3/2008 | Rosenoer .......................... 726/5 |
| 2010/0114776 A1 * | 5/2010 | Weller et al. .................... 705/44 |
| 2010/0250387 A1 * | 9/2010 | Kassaei et al. .................. 705/26 |
| 2010/0293094 A1 * | 11/2010 | Kolkowitz ............. G06Q 20/40 705/44 |
| 2011/0029902 A1 * | 2/2011 | Bailey ........................... 715/764 |
| 2011/0035788 A1 * | 2/2011 | White et al. ...................... 726/4 |
| 2011/0066493 A1 * | 3/2011 | Faith ..................... G06Q 20/40 705/14.49 |
| 2011/0141276 A1 * | 6/2011 | Borghei ........................ 348/143 |
| 2011/0191200 A1 * | 8/2011 | Bayer et al. .................. 705/26.1 |
| 2011/0225625 A1 * | 9/2011 | Wolfson et al. .................. 726/1 |
| 2011/0231911 A1 * | 9/2011 | White et al. ...................... 726/7 |
| 2013/0042298 A1 * | 2/2013 | Plaza Fonseca ...... G06F 21/335 726/1 |

* cited by examiner

*Primary Examiner* — Dede Zecher
*Assistant Examiner* — Jason C Chiang
(74) *Attorney, Agent, or Firm* — Patent Law Works LLP

(57) ABSTRACT

A system and method for generating user authentication challenges based on risk level is provided. A login request from a user is received. The login request includes identifying information associated with the user sending the login request. A risk analysis based on the identifying information associated with the user sending the login request is performed. A level of risk is identified. The level of risk is part of a risk index that includes multiple levels of risk. An authentication challenge based on the identified level of risk is generated. The login request is allowed or denied based on the completion on the authentication challenge.

21 Claims, 8 Drawing Sheets

SYSTEM AND METHOD FOR GENERATING USER AUTHENTICATION CHALLENGES

CROSS-REFERENCE TO RELATED APPLICATION

This application claims the benefit of U.S. Application No. 61/435,342, entitled "System and Method for Generating User Authentication Challenges" filed Jan. 23, 2011, the entire contents of which are herein incorporated by reference.

The specification relates to online user authentication. In particular, the specification relates to generating user authentication challenges, specifically, generating user authentication challenges based on risk level of a user.

BACKGROUND

Many websites provide the capability for users to login to view their personal information, or other information that the user wants to keep private, or even access the functionality provided by the website. Oftentimes, an added level of security is established by generating a challenge to the user attempting to login. The challenge could be the generation of a secret question or the generation of a Completely Automated Public Turing test to tell Computer and Humans Apart (CAPTCHA) to guard against possible fraudulent login attempts, and login by bots and other automated devices. Oftentimes, these challenges are automatically generated regardless who or what is attempting to make the login attempt.

SUMMARY

The present embodiments overcome the deficiencies and limitations of the prior art at least in part by providing a system and method for generating user authentication challenges based on risk level. A system for generating privacy-enhanced aggregate statistics, the system comprising: a login receiver for receiving a login request from a user, wherein the login request includes identifying information associated with the user sending the login request; a risk analysis engine for performing a risk analysis based on the identifying information associated with the user sending the login request and identifying a level of risk, wherein the level of risk is part of a risk index that includes multiple levels of risk; and a challenge generation engine for generating an authentication challenge based on the identified level of risk.

The present embodiments also provides a method for generating user authentication challenges based on risk level. A method for generating user authentication challenges based on risk level is provided. In one embodiment, a login request from a user is received. The login request includes identifying information associated with the user sending the login request. A risk analysis based on the identifying information associated with the user sending the login request is performed. A level of risk is identified. The level of risk is part of a risk index that includes multiple levels of risk. An authentication challenge based on the identified level of risk is generated. The login request is allowed or denied based on the completion on the authentication challenge.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
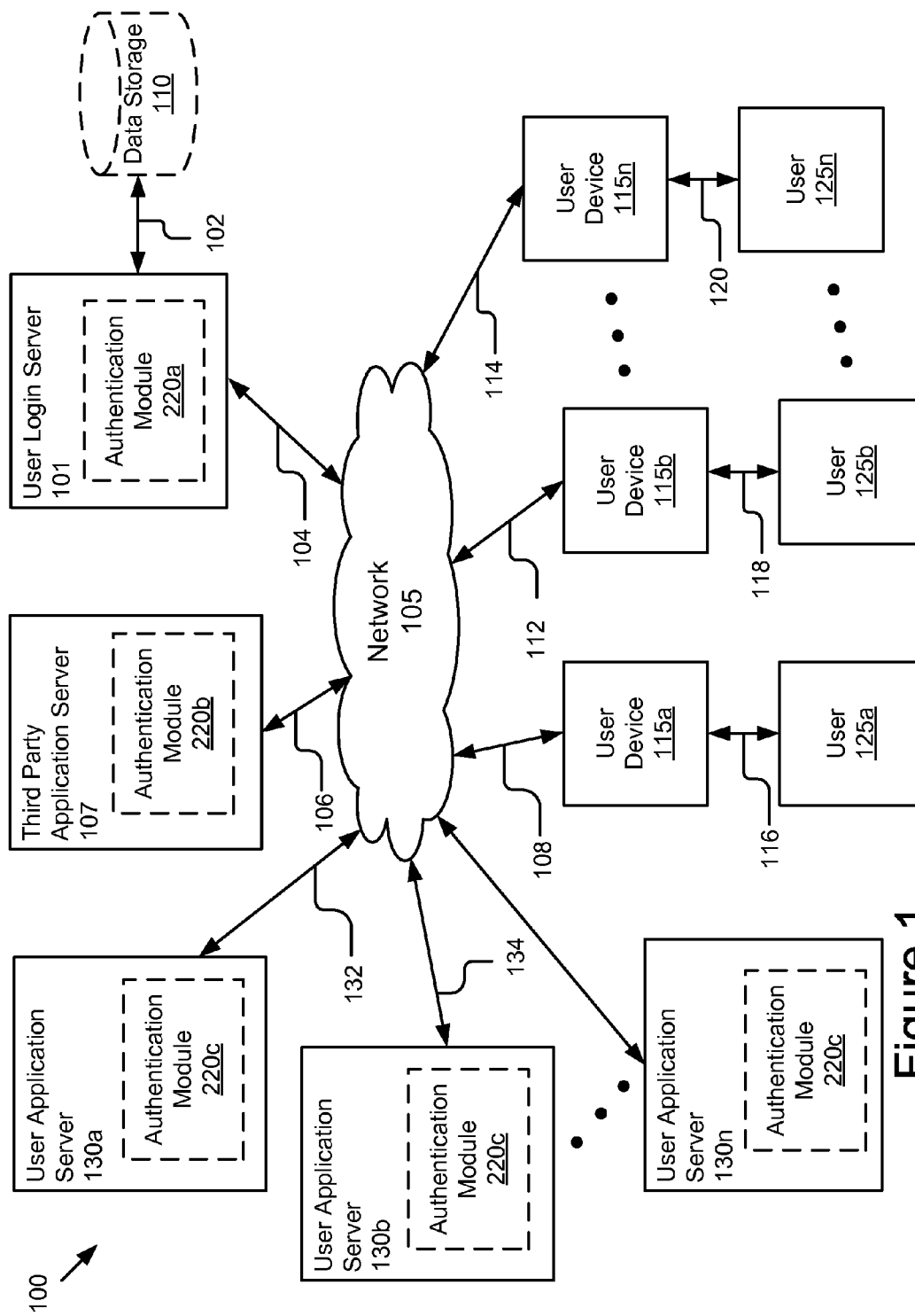
FIG. 1 illustrates a block diagram of a system for generating user authentication challenges based on risk level according to one embodiment.

A system and method for generating user authentication challenges based on risk level is described. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments described herein. For example, the present embodiments are described in one embodiment below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. In one embodiment, the implementation is in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure.

System Overview

FIG. 1 illustrates a block diagram of a system 100 for generating user authentication challenges based on risk level of a user according to one embodiment.

The illustrated embodiments of the system 100 for generating user authentication challenges based on risk level of a user includes user devices 115a, 115b and 115n that are accessed by users 125a, 125b and 125n, a user login server 101 and a third party server 107. The system 100 also includes user application servers 130a, 130b, and 130n. In the illustrated embodiment, these entities are communicatively coupled via a network 105. Although only three devices are illustrated, persons of ordinary skill in the art will recognize that any number of user devices 115n is available to any number of users 125n. Further, although only three user application servers 130a, 130b and 130n are illustrated, persons of ordinary skill in the art will recognize that any number of user application servers 130n can exist.

The user devices 115a, 115b and 115n in FIG. 1 are used by way of example. While FIG. 1 illustrates three devices, the present embodiments apply to any system architecture having one or more user devices and one or more user application servers. Furthermore, while only one network 105 is coupled to the user devices 115a, 115b, the user login server 101 and the third party server 107, in practice any number of networks 105 can be connected to the entities. Furthermore, while only one third party application server 107 is shown, the system 100 could include one or more third party application servers 107.

The network 105 enables communications between user devices 115a, 115b, 155n, the user login server 101, the third party application server 107 and user application servers 130a, 130b, 130n. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment \, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wire line or wireless (i.e., terrestrial—or satellite-based transceivers). In one embodiment, the network 105 is an IP-based wide or metropolitan area network.

In some embodiments, the network 105 helps to form a set of online relationships between users 125a, 125b, 125n, such as provided by one or more social networking systems including explicitly-defined relationships and relationships implied by social connections with other online users, where the relationships form a social graph. In some examples, the social graph can reflect a mapping of these users and how they are related.

In one embodiment, an authentication module 220a is included in the user login server 101 and is operable on the user login server 101. In another embodiment, the authentication module 220b is included in the third party application server 107 and is operable on a third party application server 107. In yet another embodiment, the authentication module 220c is included in the user application server 130a/130b/130c and is operable on the user application server 130a/130b/130c. Persons of ordinary skill in the art will recognize that the authentication module 220 can be included and is operable in any combination on the devices 115a, 115b, and 115n and servers 101, 107, 130a, 130b and 130a. In some embodiments the authentication module 220a/220b/220c includes multiple, distributed modules that cooperate with each other to perform the functions described below. Details describing the functionality and components of the authentication module 220a of the user login server 101 will be explained in further detail below with regard to FIG. 3.

In the illustrated embodiment, the user device 115a is coupled to the network 105 via signal line 108. The user 125a can interact with the user device 115a as illustrated by signal line 116. The user device 115b is coupled to the network via signal line 112. The user 125b can interact with the user device 115b as illustrated by signal line 114. The third party application server 107 is communicatively coupled to the network 105 via signal line 106. The social network server 101 is communicatively coupled to the network 105 via signal line 104. The social network server 101 is also communicatively coupled to data storage 110 via signal line 102.

In one embodiment, data storage 110 stores data and information of users 125a/125b/125n of the system 100. Such stored information includes user profiles, user login information and other information identifying the users 125a/125b/125n of the system 100. Examples of information identifying users includes, but is not limited to, the user's name, contact information, relationship status, likes, interests, links, education and employment, location, usually used user device(s) and device details (e.g., browser, machine, operating system, language, etc.), etc. In one embodiment, the information stored in data storage 110 also includes the user's list of current and past connections (which can include friends, etc.) and the user's activities within the system 100, such as anything the user posts within the system 100 and any messages that the user sends to other users. In another embodiment, the data storage 110 stores the data and information associate with the activity of the user login server 101. Such information may include user preference information.

In one embodiment, which will be discussed below, a storage device 214 (see FIG. 2) is included in the user login server 101 and storage 214 stores the data and information of users 125a/125n of the system 100. In one embodiment, the storage device 214 stores the information discussed above in relation to the information stored in the data storage 110.

In one embodiment, the user device 115a, 115n is an electronic device having a web browser for interacting with the user login server 101 via the network 105 and is used by user 125a, 125n to access information in the system 100. The user device 115a, 115b, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. A server can also be a computing device.

Example User Login Server

Figure 2:
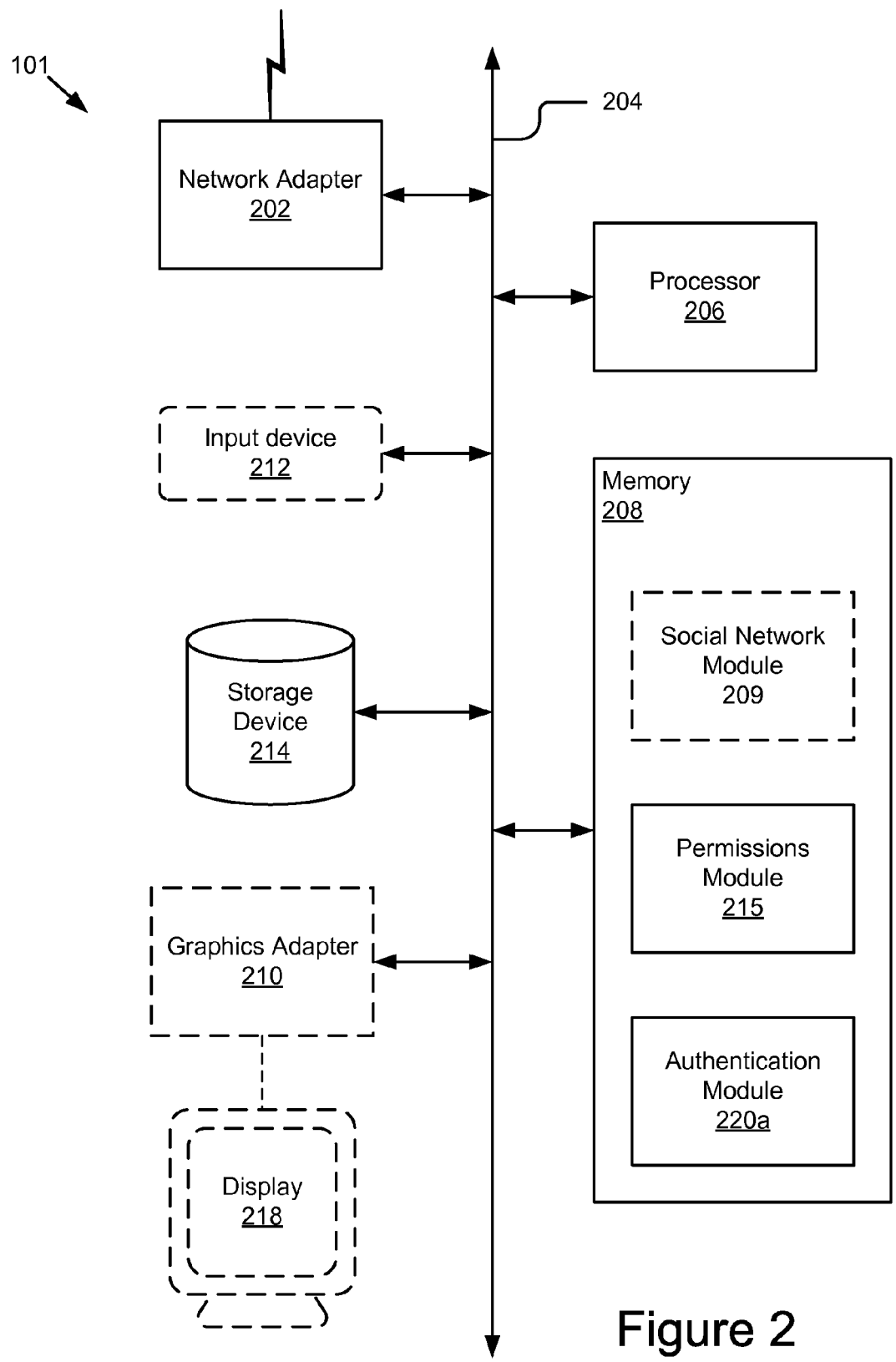
FIG. 2 is a block diagram of an embodiment of a user profile server in accordance.

FIG. 2 is a block diagram of an embodiment of a user login server 101 in accordance with one embodiment. As illustrated in FIG. 2, user login server 101 includes a network adapter 202 coupled to a bus 204. According to one embodiment, also coupled to the bus 204 are at least one processor 206, memory 208, a graphics adapter 210, an input device 212, a storage device 214. The memory 208 includes a social network module 209, a permissions module 215 and an authentication module 220a, which are executed by the processor 206. In one embodiment, the functionality of the bus 204 is provided by an interconnecting chipset. The user login server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user login server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user login server 101, including the modules related to and contained therein, also includes an operating system executable by the processor such as but not limited to WINDOWS®, MacOS X, Android, or UNIX® based operating systems. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 208 stores instructions and/or data that may be executed by processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the user login server 101. The memory 208 is coupled to the bus 204 for communication with the other components.

In one embodiment, the user login server 101 contains an optional social network module 209 stored in memory 208. Although only one user login server 101 is shown, persons of ordinary skill in the art will recognize that multiple servers may be present. A social network is any type of social structure where the users are connected by a common feature. Examples include, but are not limited to, Orkut, Buzz, blogs, microblogs, and Internet forums. The common feature can include, by way of example, friendship, family, a common interest, work, etc.

The social network module 209 is software and routines executable by the processor 206 to control the interaction between the user login server 101, storage device 214 and the user devices 115*a*, 115*b*, 115*n*. An embodiment of the social network module 209 allows users 125*a*, 125*b*, 125*n* of user devices 115*a*, 115*b*, 115*n* to perform social functions between other users 125*a*, 125*b*, 125*n* of user devices 115*a*, 115*b*, 115*n* within the system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125*a*/125*n* of the system 100. In some embodiments, such user data is stored in storage device 214. In other embodiments, such user data is stored in data storage 110. In yet other embodiments, the user data is stored both is storage device 214 and data storage 110.

The input device 212 may include a mouse, track ball, or other type of pointing device to input data into the user login server 101 including a touchscreen. The input device 212 may also include a keyboard, such as a QWERTY keyboard or other suitable physical or soft keyboard in any language. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen (touch sensitive or otherwise), or monitor. The display 218 represents any device equipped to display electronic images and data as described herein. The network adapter 202 couples the user login server 101 to a local or wide area network.

The permissions module 215 is software and routines executable by the processor 206 to control user access to various online applications. Specifically, an embodiment of the permissions module 215 is software and routines executable by the processor 206 to allow or deny user access to various online applications. In some embodiments, the permissions module 215 communications with the authentication module 220*a* via bus 204 in order to further control user access to various online applications. In some embodiments, the permissions module 215 is coupled to the storage device 214 (or data storage 110) and accesses the storage device 214 (or data storage 110) to retrieve user permission and login information.

The authentication module 220*a* is software and routines executable by the processor 206 to control the interaction and exchange of information between user devices 115*a*/115*b*/115*n* and the user login server 101 or third party application server 107. Specifically, an embodiment of the authentication module 220*a* is software and routines executable by the processor 206 to generate user authentication challenges based on risk level of a user. Details describing the functionality and components of the authentication module 220*a* will be explained in further detail below with regard to FIG. 3.

As is known in the art, a user login server 101 can have different and/or other components than those shown in FIG. 2. In addition, the user login server 101 can lack certain illustrated components. In one embodiment, a user login server 101 lacks an input device 212, graphics adapter 210, and/or display 218. Moreover, the storage device 214 can be local and/or remote from the user login server 101 (such as embodied within a storage area network (SAN)).

As is known in the art, the user login server 101 is adapted to execute computer program modules for providing functionality described herein. As used herein, the term "module" refers to computer program logic utilized to provide the specified functionality. Thus, a module can be implemented in hardware, firmware, and/or software. In one embodiment, modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Authentication Module

Figure 3:
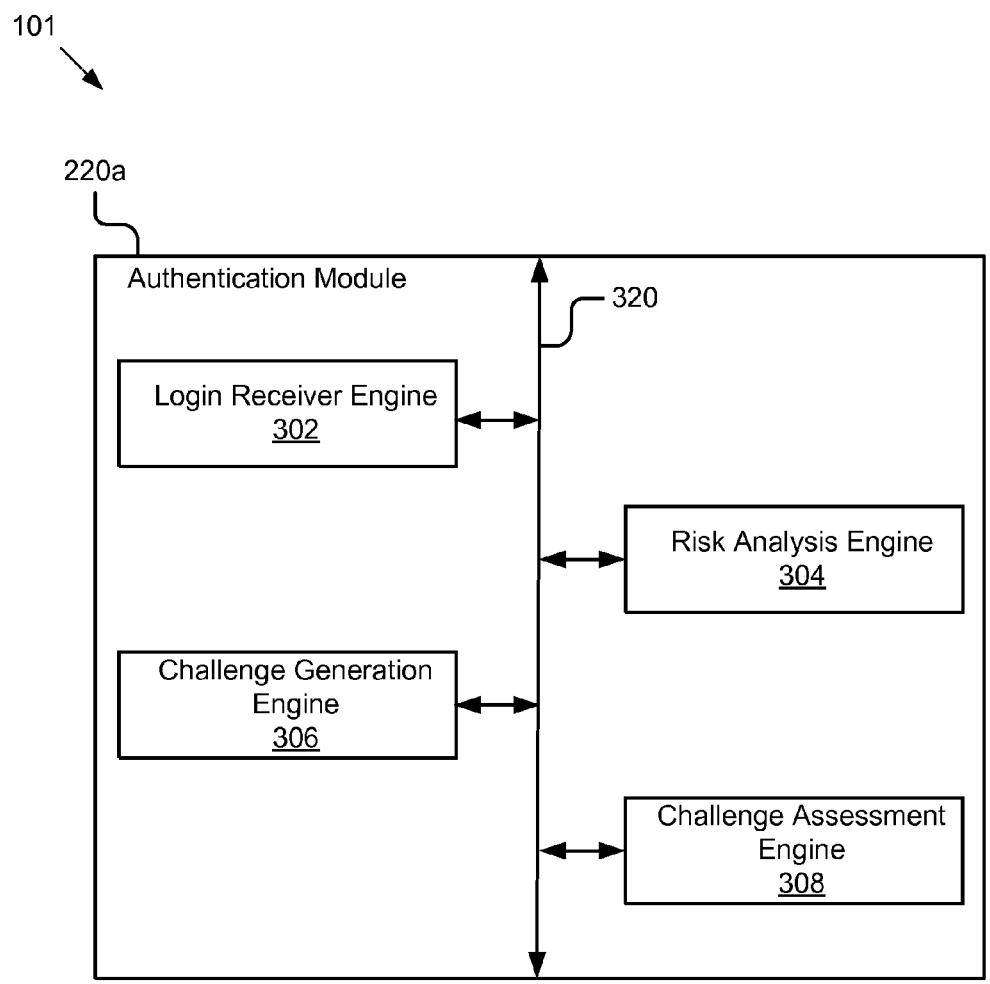
FIG. 3 is a block diagram illustrating an authentication module according to one embodiment.

Referring now to FIG. 3, the authentication module 220*a* is shown in more detail. FIG. 3 is a block diagram of a portion of the user login server 101 that includes the authentication module 220*a*. In another embodiment, the third party application server 107 includes the authentication module 220*b*. In yet another embodiment, a user application server 130 includes the authentication module 220*c*. In one embodiment, the authentication module 220*a* is software and routines executable by the processor 206 to generate user authentication challenges based on risk level.

For the purposes of describing the components and functionality of the authentication module 220*a*/220*b*/220*c*, the below description describes the authentication module 220*a*. However, one of ordinary skill in the art will appreciate that the same description will also be applicable to the functionality and components of authentication modules 220*b* and 220*c*. Moreover, while the specification primarily discusses generating a user authentication challenge based on risk level in the context of a login request, a login request, as used herein, can refer not only to a user's request to log in but also to requests for post-login actions. For example, a login request includes requests for high risk/impact post-login actions including changing the password, changing account recovery options (e.g., e-mail or phone number), permanently deleting all e-mails from the inbox, changing an advertising campaign or spending limits, etc. Additionally, the term "user" as used herein generally, but not always, refers to the user requesting login, which may be an authorized user (e.g., an account owner) or may be an unauthorized, fraudulent or adversarial user (e.g., hijacker or bot).

In one embodiment, the authentication module 220*a* comprises a login receiver engine 302, a risk analysis engine 304, a challenge generation engine 306 and a challenge assessment engine 308.

The login receiver engine 302 is software and routines executable by the processor for receiving login requests from users 125*a*, 125*b*, 12*n* of user devices 115*a*, 115*b*, 115*n*. In one embodiment, the login receiver engine 302 is a set of instructions executable by the processor 206 to provide the functionality described below for receiving login requests from users 125a, 125b, 125n of user devices 115a, 115b, 115n. In another embodiment, the login receiver engine 302 is stored in the memory 208 of the user login server 101 and is accessible and executable by the processor 206. In either embodiment, the login receiver engine 302 is adapted for cooperation and communication with the processor 206 and other components of the user login server 101 via signal line 320 and bus 204.

According to one embodiment, the login receiver engine 302 is communicatively coupled to the storage device 214 via signal line 320 and bus 204. The login receiver engine 302 of the authentication module 220a is also communicatively coupled by the signal line 320, bus 204 and the network 105 to the user devices 115a, 115b, 115n in order to receive login requests from the devices 115a, 115b, 115n. As alluded to above, a person having ordinary skill in the art will recognize that the login receiver engine 302 can be adapted, in other embodiments, to receive different or other requests for action from the devices 115a, 115b, 115n, for example, a request to change the password, account recovery options, advertising campaigns or spending limits, permanently delete all e-mails from the inbox, etc. Additionally, the login receiver engine 302 of the authentication module 220a is communicatively coupled to the permissions module 215 via signal line 320 and bus 204. In addition to login requests that include a user's username and password, the login receiver engine 302 also receives other information related to the identity and location of the user and information associated with authentication of the user. Such information may include, but is not limited to, the IP address of the computer from which the login request is coming, the device identification number of the device being used and other device details (e.g., the operating system, language, etc.), the location of the computer from which the login request is coming, including the state and or country, and browser cookies.

Figure 5A:
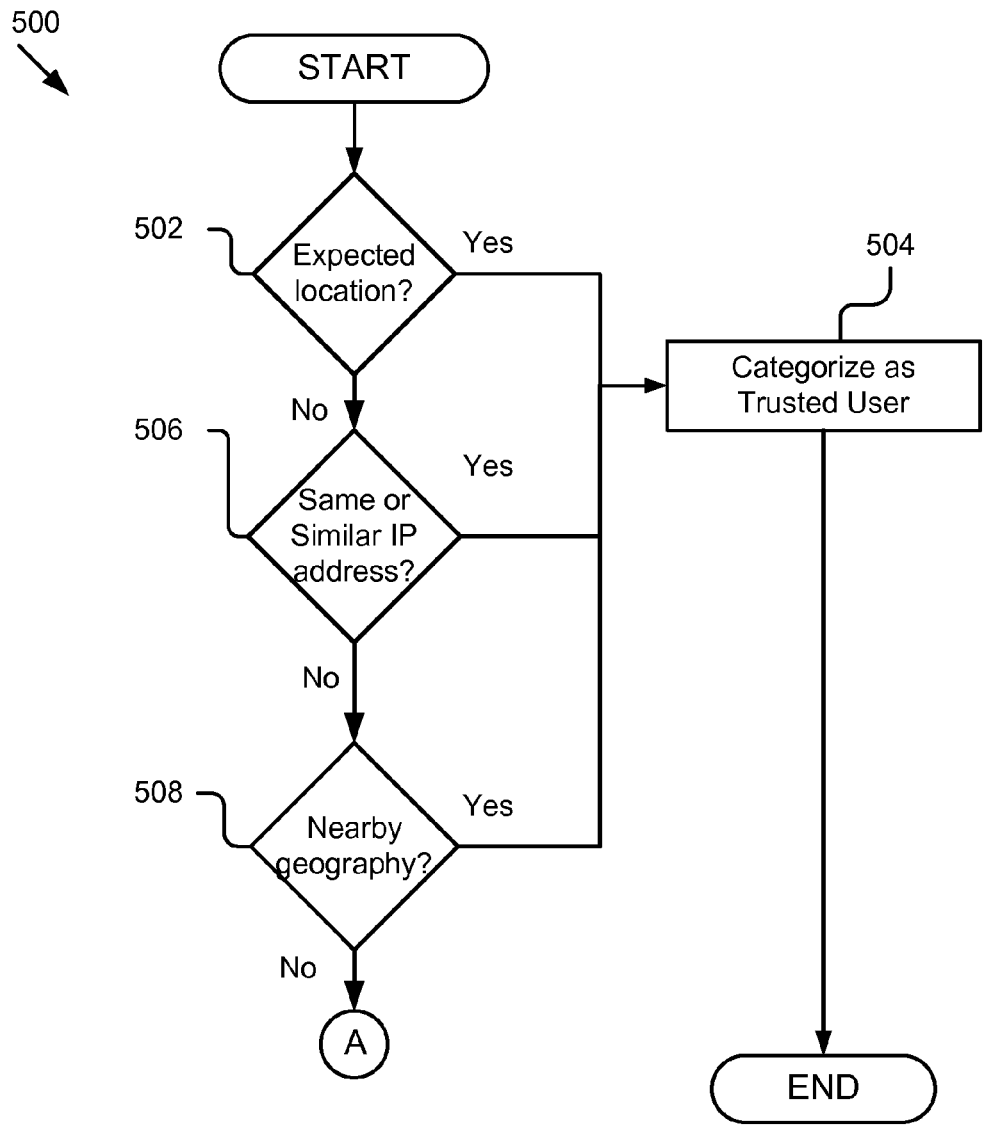
FIG. 5A is a flow chart illustrating part of a method for analyzing and determining risk level of a user according to one embodiment.
Figure 5B:
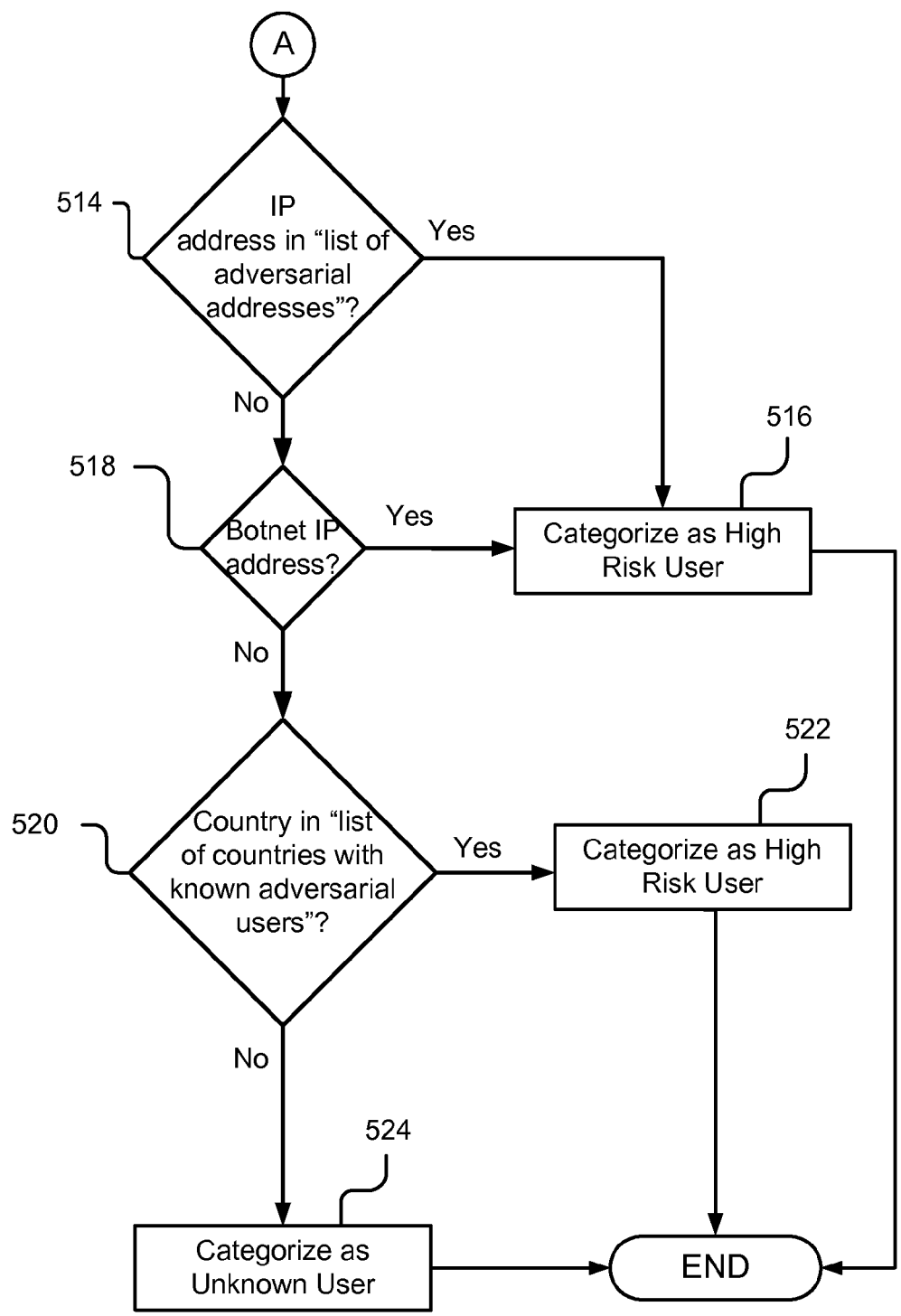
FIG. 5B is a flow chart illustrating another part of a method for analyzing and determining risk level of a user according to one embodiment.

The risk analysis engine 304 is software and routines executable by the processor for analyzing and determining risk level of the user, specifically, the risk level of the likelihood that the user attempting to login to an account is an unauthorized user. FIGS. 5A and 5B, which will be described in more detail below, depict flow charts illustrating a method for analyzing and determining risk level of a user according to one embodiment. In one embodiment, the risk analysis engine 304 is a set of instructions executable by the processor 206 to provide the functionality described below for analyzing and determining risk level of the user. In another embodiment, the risk analysis engine 304 is stored in the memory 208 of the user login server 101 and is accessible and executable by the processor 206. In either embodiment, the risk analysis engine 304 is adapted for cooperation and communication with the processor 206 and other components of the user login server 101 via signal line 320 and bus 204.

The risk analysis engine 304 analyzes and determines the likelihood the user attempting to login is an unauthorized user. In some embodiments, the risk analysis engine 304 receives the login request information along with the other related information described above from the login receiver engine 302. In some embodiments, the risk analysis engine 304 uses the received information to categorize the user into various levels of risk.

As an illustration, according to one embodiment, the levels of risk are organized in a risk index including four different levels. The levels are assigned a numerical value and each numerical value corresponds to an identified level of risk, such as "Trusted User," "Unknown User," "Low Risk User," "High Risk User." In such embodiments the first level in the risk index is "0," the second level of risk is "1," the third level of risk is "2" and the fourth level of risk is "3." The first level of risk corresponds to a "Trusted User" level of risk. The second level of risk corresponds to an "Unknown User" level of risk. The third level of risk corresponds to a "Low Risk User." The fourth level of risk corresponds to a "High Risk User."

It should be appreciated that the above identified levels of risk are examples of various levels of risk that could be assigned to a user. In some embodiments, different categories are assigned and different names are given to the categories or levels of risk. In some embodiments, the identified levels of risk indicate the degree of confidence that the system 100 has that the user is an adversarial user. For example, a user may be categorized as a "Low Risk User" if the system 100 has little reputation information about the user, and therefore the confidence that the user is an adversarial user is low. Similarly, a user may be categorized as a "High Risk User" if the adversarial reputation data of the user is abundant or clearly indicates an adversarial user, and therefore, the system 100 has high confidence that the user is an adversarial user.

As stated above, the risk analysis engine 304 analyzes and determines the likelihood the user attempting to login is an unauthorized user. The risk analysis engine 304 of the authentication module 220a performs a series of determinations regarding information about the user in order to determine the user's level of risk. The series of inquiries allows the risk analysis engine 304 to categorize the user according to the categories and levels of risk outlined above. According to one embodiment, the risk analysis engine 304 determines whether the login request is coming from an expected location or device using techniques including but not limited to IP geolocation, cookies, and device fingerprints. In such embodiments, if the determination is made that the login request is from an expected location or device, the user is categorized as a "Trusted User." For example, if the user is logging in from the same computer as the last time that user logged in, the user is a categorized and a "Trusted User." In some embodiments, location is determined by the IP address associated with the user. In some embodiments, the risk analysis engine 304 determines whether the login request is coming from the same IP address or an IP address similar to one used on a recent, previous, successful login attempt. In such embodiments, if the determination is made that the IP address is the same as, or similar to, the IP address of the previous successful login request as the same user, the user is categorized as a "Trusted User." In some embodiments, a determination is made as to what geographic region the login request is originating from. If the login request is coming from the same country, for example, as the previous, recent, successful login request of that user, the user is categorized as a "Trusted User."

In some embodiments, if the user does not fall into the "Trusted User" category, the analysis continues. In some embodiments, the information of the login request is compared to a list of information known to be associated with known adversarial users. In some embodiments, the information includes IP addresses, web cookies, user agent strings, header orders, etc. that are known to be associated with fraudulent login attempts. For example, in one embodiment, the IP address of the login request is compared to a list of known adversarial IP addresses. In some embodiments, this list of known adversarial IP addresses can be IP addresses of known adversarial users who frequently attempt unauthorized login attempts. In such embodiments, if the IP address of the login request matches an IP address in the list, the user is categorized as a "High Risk User." According to some embodiments, the IP address of the login request is compared to a list of IP addresses that are known to be associated with botnets, or machines programmed to automatically attempt unpermitted login requests. In such embodiments, if the IP address matches on the list, the user is categorized as a "High Risk User." In other embodiments, where such identification may not be confirmed, an IP address associated with a botnet may be categorized as a "Low Risk User." In such cases, because the information tracking botnets may be short-lived or error-prone, the system may be more conservative with the severity of the challenge that is generated. For example, in such cases, the system may generate a simple challenge most or all authentic users will pass since the probability that botnets will pass this type of challenge is very low or not expected.

Figure 7:
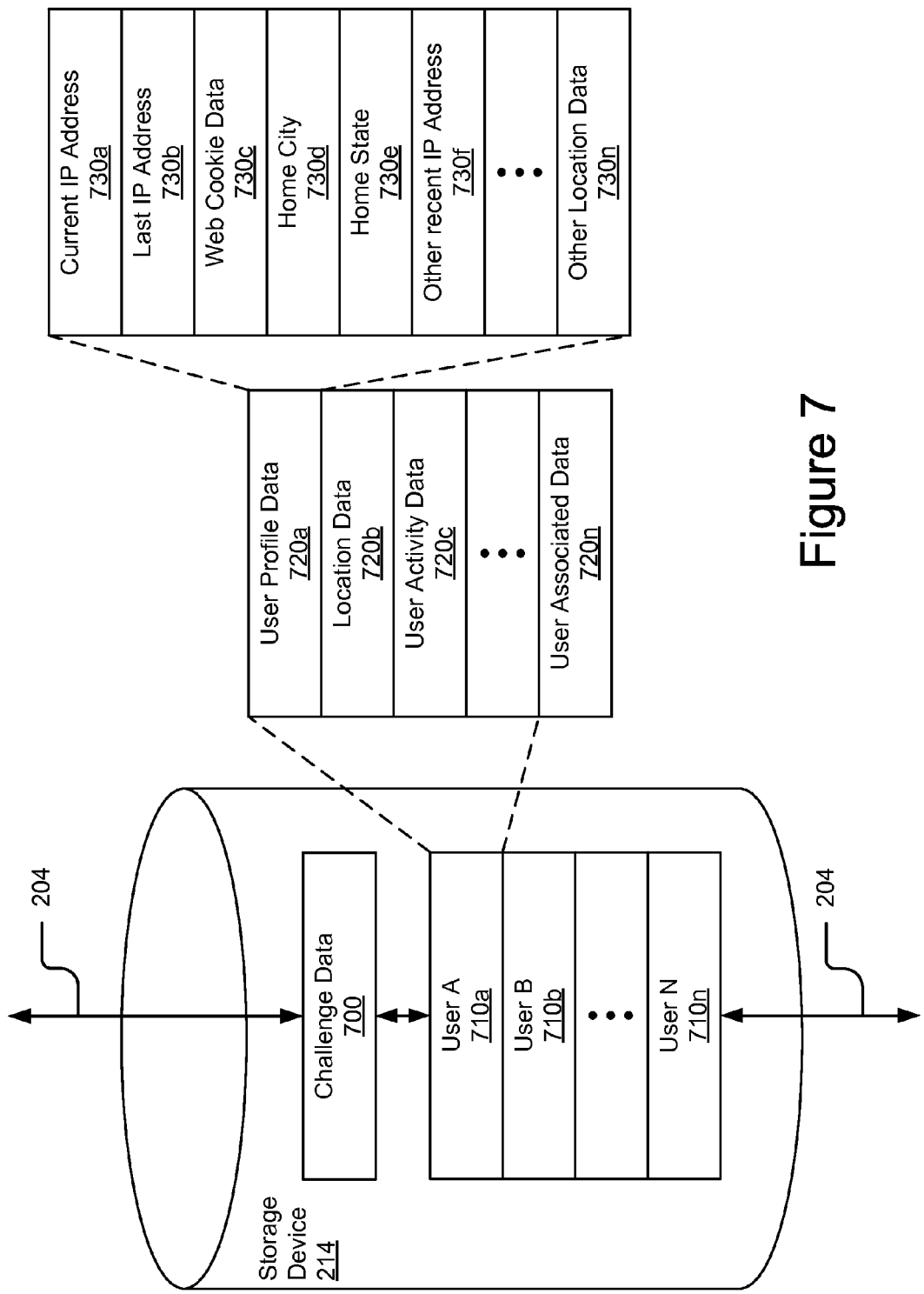
FIG. 7 is a block diagram illustrating a storage device storing data sets of user information, including location information associated with the user, on storage device in the system according to one embodiment.

In some embodiments, if the user does not fall into the "High Risk User" category, the analysis continues. In some embodiments, the country of the login request is determined (e.g., from the IP address) and compared to a list of countries with high probability of adversarial users. In such embodiments, if the country of the login request matches one of the countries on the list, the user is categorized as a "Low Risk User." In some embodiments, if the user does not fall into either the "High Risk User" category or the "Low Risk User" category, the user is categorized as an "Unknown User." It should be noted that the categorizations and criteria used are illustrative. A person having ordinary skill in the art will recognize that different and/or other categories and criteria exist and can be applied. As an example, FIG. 7 illustrates a block diagram illustrating a storage device storing challenge data 700 and data sets 710*a*-710*n* of user information, including location information associated with the user, on storage device is shown. As shown in this example, User A data set 710*a* includes information associated with the User A. The information associated with User A includes User Profile Data 720*a*, Location Data 720*b*, User Activity Data 720*c* and, possibly, any amount of additional User Associated Data 720*n*. Location Data 720*b* includes the user's current IP address 730*a*, the last known IP address of User A 730*b*, web cookie data associated with User A 730*c*, User A's home city 730*d*, User A's home geographic state 730*e*, other recent IP addresses associated with User A 730*f* and, possibly, any amount of location data associated with User A 730*n*.

The challenge generation engine 306 is software and routines executable by the processor for generating authentication challenges based on identified level of risk. In one embodiment, the challenge generation engine 306 is a set of instructions executable by the processor 206 to provide the functionality described below for generating authentication challenges based on identified level of risk. In another embodiment, the challenge generation engine 306 is stored in the memory 208 of the user login server 101 and is accessible and executable by the processor 206. In either embodiment, the challenge generation engine 306 is adapted for cooperation and communication with the processor 206 and other components of the user login server 101 via signal line 320 and bus 204.

According to some embodiments, the challenge generation engine 306 analyzes the risk level of the user by determining the categories assigned by the risk analysis engine 304 and determines whether to generate a challenge and if so, what challenge to generate.

In some embodiments, if the user has been categorized as a "Trusted User," the challenge generation engine 306 does not generate a challenge and allows the login request to proceed. In some embodiments, if the user has been categorized as an "Unknown User," the challenge generation engine 306 also does not generate a challenge and allows the login request to proceed. In some embodiments, if the user has been categorized as a "Low Risk User," the challenge generation engine 306 generates a simple challenge. In some embodiments, a simple challenge is one that good users will always pass and adversarial users sometimes pass as well. In some embodiments, for example, a simple challenge includes the challenge generation engine 306 sending a code via an SMS message to a mobile phone. The user can then retrieve the code from the mobile phone in order to successfully complete the challenge.

In some embodiments, if the user has been categorized as a "High Risk User," the challenge generation engine 306 generates a difficult challenge. In some embodiments, a difficult challenge is one that good users may fail, but adversarial users will almost always fail. For example, in some embodiments, the challenge generation engine 306 generates a question that only the true account holder would know the answer to, and fraudulent users would not know the answer. In some embodiments, for example, the challenge generation engine 306 generates a secret question. The secret question may be a question that was answered upon setting up a user's account. When the user answers the secret question correctly, the challenge is successfully completed. In other embodiments, the challenge generation engine 306 generates a question to the user attempting to log in regarding the last location of the previous successful login attempt. When the user answers the question correctly, the challenge is successfully completed. In some embodiments, the challenge generation engine 306 generates a question based on information provided by the user when setting up the account or at another time prior to the login request, e.g., the user's phone number, city the user normally logs in from, or biometric information such as the user's image, voice print. When the user answers the question correctly or the biometric information is authenticated, the challenge is successfully completed. A person having ordinary skill will recognize that these same methods may also be used to generate a simple challenge.

In some embodiments, if the user has been categorized as a "High Risk User," the challenge generation engine 306 denies the login attempt. In some embodiments, if the user has been categorized as a "High Risk User," the challenge generation engine 306 denies the login attempt even though the login request may have the correct login information.

In some embodiments, the challenge generation engine 306 accesses the challenge data 700 of the storage device 214 to determine what challenge to generate. The storage device 214 not only stores information about the user, but also stores challenge data 700. In some embodiments, the challenge data 700 organizes the various challenges into simple challenges and difficult challenges.

The challenge assessment engine 308 is software and routines executable by the processor for determining whether a generated authentication challenge has been successfully completed. In one embodiment, the challenge assessment engine 308 is a set of instructions executable by the processor 206 to provide the functionality described below for determining whether a generated authentication challenge has been successfully completed. In another embodiment, the challenge assessment engine 308 is stored in the memory 208 of the user login server 101 and is accessible and executable by the processor 206. In either embodiment, the challenge assessment engine 308 is adapted for cooperation and communication with the processor 206 and other components of the user login server 101.

According to some embodiments, the challenge assessment engine 308 receives a response from the user after the challenge generation engine 306 generates, sends and presents an authentication challenge to the user via user devices 115a, 115b, and 115n. The challenge assessment engine 308 compares the received response with information associated with the user stored in storage device 214. In some embodiments, the challenge assessment engine 308 analyzes the user's interaction with the challenge (e.g., mouse movement). In such embodiments, the user interaction with the challenge can alter the user risk level and/or result in blocking login even if the user answers the challenge successfully.

Example Processes

Figure 4:
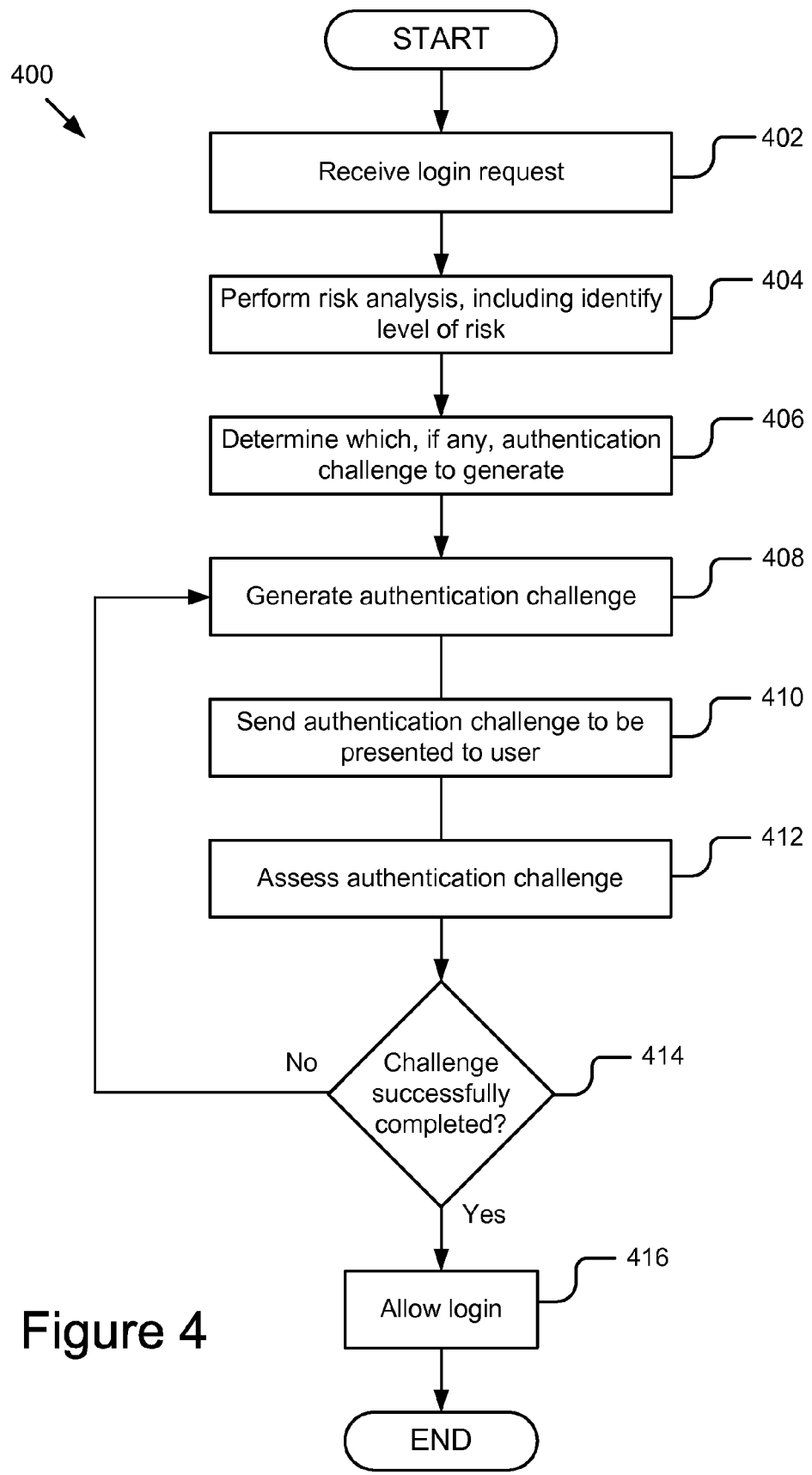
FIG. 4 is a flow chart illustrating a method for generating user authentication challenges based on risk level according to one embodiment.

Referring now to FIG. 4, a flow chart illustrating an embodiment of a method 400 for generating an authentication challenge based on risk level of a user. The method 400 begins when the login receiver engine 302 of the authentication module 220a receives 402 a login request from a user 125a/125b125n of a user device 115a/115b/115n. The risk analysis engine 304 of the authentication module 220a performs 404 an analysis of the risk that the user is an adversarial user.

Turning to FIG. 5A, a flow chart illustrating a method 500 for analyzing and determining risk level of a user as performed by the risk analysis engine 304 of the authentication module 220a is shown. According to one embodiment, a determination 502 is made as to whether the login request is coming from an expected location. For example, in some embodiments, data associated with the computer of the user is retrieved and the determination is made according to the information associated with the computer of the user. Such information may include the device identification number, device details, IP address or the web cookies associated with the computer. In some embodiments, an expected location is a location from where the user has previously successfully logged in. As seen in the example data structure illustrated in FIG. 7, various location information about the user is stored in data storage 214 and expected location may be determined by comparing the location information associated with the user with the location information of the login request. If the login request is coming from an expected location (502—Yes), the user is categorized 504 as a "Trusted User." In some embodiments, the risk level of the user is identified as "0." If the login request is not coming from an expected location (502—No), the analysis continues.

The risk analysis engine 304 then determines 506 whether the login request is coming from an IP address similar to or the same as one used on a recent, previous, successful login attempt. If the IP address is similar or the same (506—Yes), then the user is categorized 504 as a "Trusted User." If the IP address is not similar or the same (506—No), the analysis continues.

The risk analysis engine 304 continues the risk analysis and determines 508 whether the login attempt is coming from a location close in proximity to one from which the account was previously accessed. For example, if the last successful login attempt was made from California, and a login attempt is received from Nevada, it is possible that the user traveled from California to Nevada within a relatively short amount of time and is attempting to login from Nevada. In some embodiments, a nearby location includes a location that is within the same geographic city as the previous login request. In some embodiments, the engine 304 looks at the time between login attempts as an additional factor. If the login request is coming from a nearby geography (508—Yes), then the user is categorized 504 as a "Trusted User." If the login request is not coming from a nearby geography (508—No), the analysis continues.

Turning to FIG. 5B, the risk analysis engine 304 then determines 514 whether the IP address associated with the login request is on a list of known high-risk IP addresses, in other words, IP addresses that are known to be associated with adversarial users, or users who frequently attempt fraudulent login attempts. As discussed above, the list may include other or different information for determining adversarial users including, but not limited to, web cookies, user agent strings, header orders, etc. that are known to be associated with adversarial users. In some embodiments, the engine 304 compares the IP address associated with the login request to a list of IP addresses that are known to be associated with adversarial users. If the IP address associated with the login request is a known high-risk IP address (514—Yes), then the user is categorized 516 as a "High Risk User." If the IP address associated with the login request is not a known high-risk IP address (514—No), the analysis continues.

The risk analysis engine 304 determines 518 whether the IP address associated with the login request is likely to be the IP address of a computer or other device programmed to automatically attempt fraudulent login requests or a botnet. In some embodiments, this determination is done by comparing the IP address of the login request to a list of IP addresses that are known to be associated with these types of devices. If the login request is coming from a computer associated with the IP address of a botnet, or other similar device (518—Yes), then the user is categorized 516 as a "High Risk User." If the login request is not coming from a computer associated with the IP address of a botnet or other similar device (518—No), the analysis continues The risk analysis engine 304 then determines 520 whether the country from which the login request is coming is a country with many known adversarial users. In some embodiments, this determination is made by comparing the country from which the login request is coming from to a list of countries that are known to originate fraudulent login requests. If the login request is coming from a high-risk country (520—Yes), then the user is categorized 522 as a "High Risk User." If the login request is not coming from a high-risk country (522—No), then the user is categorized 524 as an "Unknown User."

Figure 6:
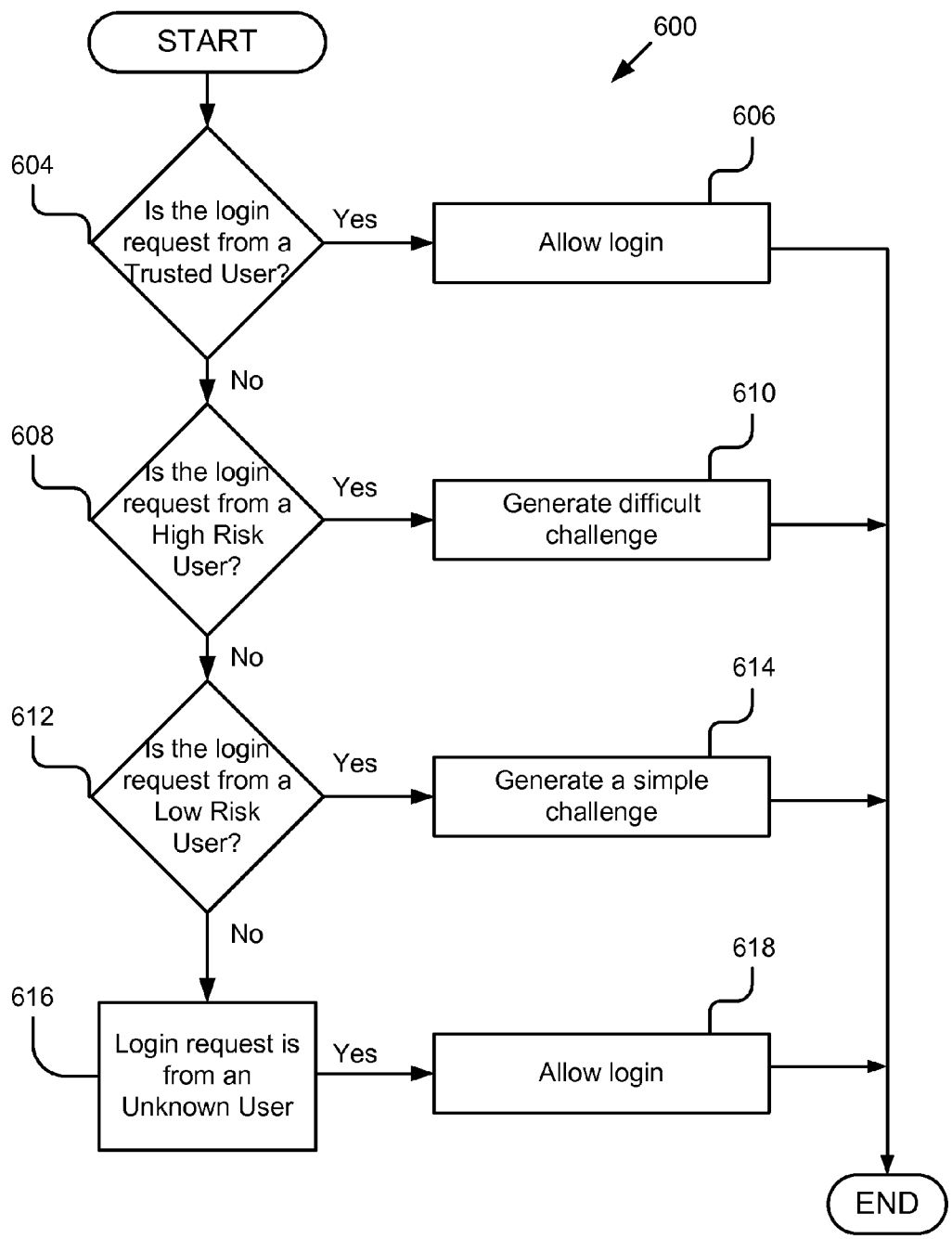
FIG. 6 is a flow chart illustrating a method for identifying risk level of a user and generating an associated challenge according to one embodiment.

Turning back to FIG. 4, the challenge generation engine 306 of the authentication module 220a determines 406 whether to issue an authentication challenge, and if so, what authentication challenge to generate 408. FIG. 6 is a flow chart illustrating a method 600 for identifying risk level of a user and generating an associated challenge according to one embodiment. First, a determination 604 is made to determine whether the login request is from a "Trusted User." If the login request is from a "Trusted User," (604—Yes), then the login attempt is allowed 606. If the login request is not from a "Trusted User," (604—No), the analysis continues. The challenge generation engine 306 determines 608 whether the login request is coming from a "High Risk User." If the login request is coming from a "High Risk User," (608—Yes), then a difficult challenge is generated 610. Alternatively, the login request from a "High Risk User" is denied (not shown) regardless of whether the user entered the correct login information. If the login request is not coming from a "High Risk User," (608—No), the analysis continues. The challenge generation engine 306 then determines 612 whether the login request is coming from a "Low Risk User." If the login request is coming from a "Low Risk User," (612—Yes), then a simple challenge is generated 614. If the login request is not coming from a "Low Risk User," (612—No), the login request is coming from an "Unknown User." If the login request is coming from an "Unknown User," the "Unknown User" is allowed to login 618.

Again turning back to FIG. 4, the challenge generation engine 306 sends the authentication challenge for presentation to the user attempting to login. The challenge assessment engine 308 of the authentication module 220a receives a response from the user and assesses 412 the authentication challenge and determines 414 whether the generated challenge was completed successfully. If the challenge was completed successfully (414—Yes), the login is allowed 416. In some embodiments, if the generated challenge was not completed successfully (414—No), another authentication challenge is generated 408. In some embodiments, this cycle of generating 408 and determination 414 of successful completion is repeated until the challenge is successfully completed. In other embodiments, this cycle of generating 408 and determination 414 of successful completion is repeated for a limited number of times and after the limit is reached, a warning is sent for display (not shown). In some embodiments, this cycle of generating 408 and determination 414 of successful completion is repeated a number of times, then after an unreasonable number of unsuccessful attempts the challenge may become unavailable for a period of time (not shown), in addition the next "trusted session pilot" to sign in may be notified about the unsuccessful attempt to access the account, given details about the location and device used in that attempt, and prompted to change the account password provided the details are unfamiliar.

The foregoing description of the embodiments of the present embodiments have been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure is intended to be illustrative, but not limiting, of the scope of the present embodiments, which is set forth in the following claims.

The foregoing data/information is collected upon user consent. In some implementations, a user is prompted to explicitly allow data collection. Further, the user may opt in/out of participating in such data collection activities. Furthermore, the collected data can be anonymized prior to performing the analysis to obtain the various statistical patterns described in this document.

What is claimed is:

1. A computer-implemented method performed by one or more computing devices for generating an authentication challenge to a user, the method comprising:
   receiving, at the one or more computing devices, a first login request from a user, wherein the first login request includes identifying information associated with the user from which the first login request was received;
   performing a risk analysis of the user, using the one or more computing devices, based on the identifying information associated with the user sending the first login request;
   identifying, using the one or more computing devices, a level of risk associated with the user based on a comparison between an IP address of the user and a list of known adversarial IP addresses and a determination of a proximity between a first origin of the first login request and a second origin of a previous successful login request combined with a time between the first login request and the previous successful login request, wherein the level of risk associated with the user is one of two or more levels of risk associated with a risk index wherein each of the two or more levels of risk represents a degree of confidence the user is an adversarial user;
   determining, at the one or more computing devices, whether to generate an authentication challenge based at least in part on the identified level of risk of the user;
   if a determination is made to generate the authentication challenge based at least in part on the identified level of risk of the user, generating, at the one or more computing devices, the authentication challenge associated with a level of difficulty, the level of difficulty of the authentication challenge based at least in part on the identified level of risk of the user; and
   sending the generated authentication challenge for display to the user from which the first login request was received.

2. The computer-implemented method of claim 1, further comprising:
   analyzing the user's interaction with the authentication challenge and altering the level of risk associated with the user or denying the first login request based on the user's interaction.

3. The computer-implemented method of claim 1, wherein the analyzing further includes organizing the levels of risk into the risk index.

4. The computer-implemented method of claim 1, further comprising:
   receiving a response from the user and assessing completion of the authentication challenge based on the response from the user.

5. The computer-implemented method of claim 1, wherein the generated authentication challenge for the level of risk is different from a second authentication challenge associated with a second level of risk, wherein the second level of the two or more levels of risk associated with a risk index.

6. The computer-implemented method of claim 1, further comprising:
   identifying an authentication challenge from multiple authentication challenges, each of the multiple authentication challenges including a degree of difficulty associated with at least one of the multiple levels of risk.

7. The computer-implemented method of claim 1, wherein the level of difficulty of the authentication challenges generated varies in degree of difficulty.

8. The computer-implemented method of claim 1, wherein at least one of the multiple levels of risk correspond to a simple authentication challenge.

9. The computer-implemented method of claim 1, wherein at least one of the multiple levels of risk correspond to a difficult authentication challenge.

10. The computer-implemented method of claim 1, wherein at least one of the multiple levels of risk corresponds to eliminating the generation of an authentication challenge.

11. The computer-implemented method of claim 1, wherein identifying the level of risk associated with the user based on the determination of the proximity between the first origin of the first login request the second origin of the previous successful login request combined with the time between the first login request and the previous successful login request includes calculating whether the time between the first login request at a first geographic location and the previous successful login request at a second geographic location exceeds a travel time between the first geographic location and the second geographic location.

12. A system for generating an authentication challenge to a user, the system comprising:
   one or more processors;
   a login receiver stored on a memory and executable by the one or more processors for receiving a first login request from a user, wherein the first login request includes identifying information associated with the user sending the first login request;
   a risk analysis engine stored on a memory and executable by the one or more processors for performing a risk analysis of the user based on the identifying information associated with the user sending the first login request and identifying a level of risk associated with the user based on a comparison between an IP address of the user and a list of known adversarial IP addresses and a determination of a proximity between a first origin of the first login request and a second origin of a previous successful login request combined with a time between the first login request and the previous successful login request, wherein the level of risk associated with the user is part of a risk index that includes multiple levels of risk wherein each of the multiple levels of risk represents a degree of confidence the user is an adversarial user; and
   a challenge generation engine stored on a memory and executable by the one or more processors for determining whether to generate an authentication challenge based on the identified level of risk of the user, generating the authentication challenge associated with a level of difficulty, the level of difficulty of the authentication challenge based on the identified level of risk of the user if a determination is made to generate the authentication challenge based on the identified level of risk of the user and sending the authentication challenge for display to the user.

13. The system of claim 12, further comprising:
   a challenge assessment engine stored on a memory and executable by the one or more processors for analyzing the user's interaction with the authentication challenge and altering the level of risk associated with the user or denying the first login request based on the user's interaction.

14. The system of claim 12, further comprising:
   a challenge assessment engine stored on a memory and executable by the one or more processors for receiving a response from the user and assessing completion of the authentication challenge based on the response from the user.

15. The system of claim 12, wherein the generated authentication challenge for the level of risk is different from a second authentication challenge associated with a second level of risk, wherein the second level of the two or more levels of risk associated with a risk index.

16. The system of claim 12, further comprising identifying an authentication challenge from multiple authentication challenges, each of the multiple authentication challenges including a degree of difficulty associated with at least one of the multiple levels of risk.

17. The system of claim 12, wherein the level of difficulty of the authentication challenges generated varies in degree of difficulty.

18. The system of claim 12, wherein at least one of the multiple levels of risk correspond to a simple authentication challenge.

19. The system of claim 12, wherein at least one of the multiple levels of risk correspond to a difficult authentication challenge.

20. The system of claim 12, wherein at least one of the multiple levels of risk corresponds to eliminating the generation of an authentication challenge.

21. A non-transitory computer-readable medium encoded with computer-readable program code, the program code comprising instructions for:
   receiving a first login request from a user, wherein the first login request includes identifying information associated with the user from which the first login request was received;
   performing a risk analysis of the user based on the identifying information associated with the user sending the first login request;
   identifying a level of risk associated with the user based on a comparison between an IP address of the user and a list of known adversarial IP addresses and a determination of a proximity between a first origin of the first login request and a second origin of a previous successful login request combined with a time between the first login request and the previous successful login request, wherein the level of risk associated with the user is one of two or more levels of risk associated with a risk index, wherein each of the two or more levels of risk represents a degree of confidence the user is an adversarial user;
   determining whether to generate an authentication challenge based at least in part on the identified level of risk of the user;
   if a determination is made to generate the authentication challenge based at least in part on the identified level of risk of the user, generating the authentication challenge associated with a level of difficulty, the level of difficulty of the authentication challenge based at least in part on the identified level of risk of the user; and
   sending the generated authentication challenge for display to the user from which the first login request was received.

* * * * *